June 28, 1938.  H. R. TEAR  2,121,996
LUBRICATING DEVICE
Filed Sept. 19, 1936   3 Sheets-Sheet 1

INVENTOR
HARRY R. TEAR
BY McConkey & Booth
ATTORNEYS.

June 28, 1938.　　　　　H. R. TEAR　　　　　2,121,996
LUBRICATING DEVICE
Filed Sept. 19, 1936　　　3 Sheets-Sheet 3

INVENTOR
HARRY R. TEAR
BY McConkey & Booth
ATTORNEYS

Patented June 28, 1938

2,121,996

UNITED STATES PATENT OFFICE 2,121,996

LUBRICATING DEVICE

Harry R. Tear, Evanston, Ill., assignor to The Lubrication Corporation, Chicago, Ill., a corporation of Delaware Application September 19, 1936, Serial No. 101,573

9 Claims. (Cl. 221—47.1)

This invention relates to lubricating devices and more particularly to devices for use with factory filled lubricant cartridges and to piston guiding means for such cartridges.

Factory filled lubricant cartridges formed of relatively thin material and having slidable pistons or followers forming one end closure therefor have been proposed for use in various types of power and hand operated lubricant equipment and the advantages of such cartridges are now well known. Owing to the necessity of keeping the cost of cartridges as low as possible it is desirable that the pistons or followers be short. One disadvantage arising from this feature, particularly in power equipment, is that the cartridge pistons or followers have a tendency to tilt or cock, thereby interfering with the proper discharge of lubricant and sometimes damaging the cartridge side wall.

It is, accordingly, one of the objects of the present invention to provide means for preventing tilting or cocking of the piston in a lubricant cartridge.

Another object of the invention is to provide a cartridge piston guide to prevent a cartridge piston from tilting or cocking.

Preferably, the guide is formed with appreciable weight to urge the piston against the contents of the cartridge when the cartridge axis is vertical with a force tending to move the piston through the cartridge and displace the contents, thereby reducing the effort necessary to withdraw the contents of the cartridge into a pump or the like. This feature is particularly desirable in connection with cartridges containing highly viscous lubricants.

Other objects, advantages and novel features of the invention will appear from the following detailed description when read in connection with the accompanying drawings, in which.

Figure 1:
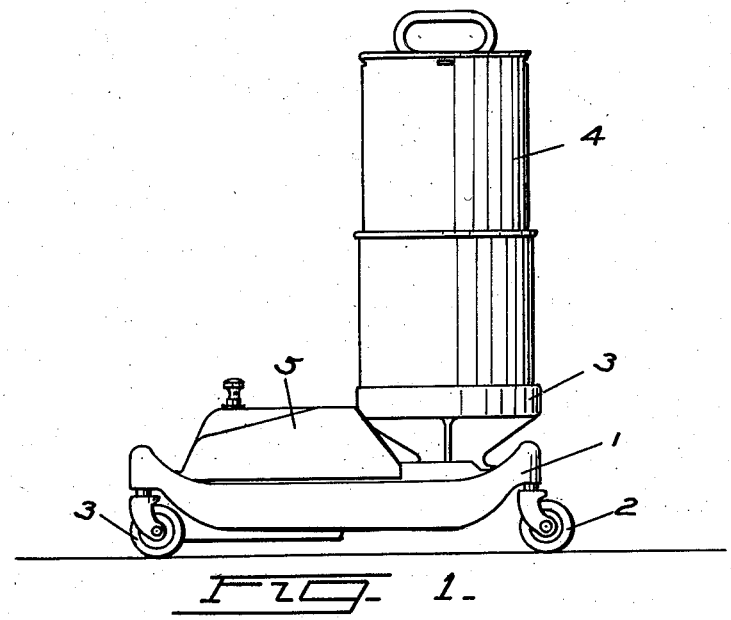
Figure 1 is a side elevation of a power operated lubricant dispenser embodying the invention.
Figure 2:
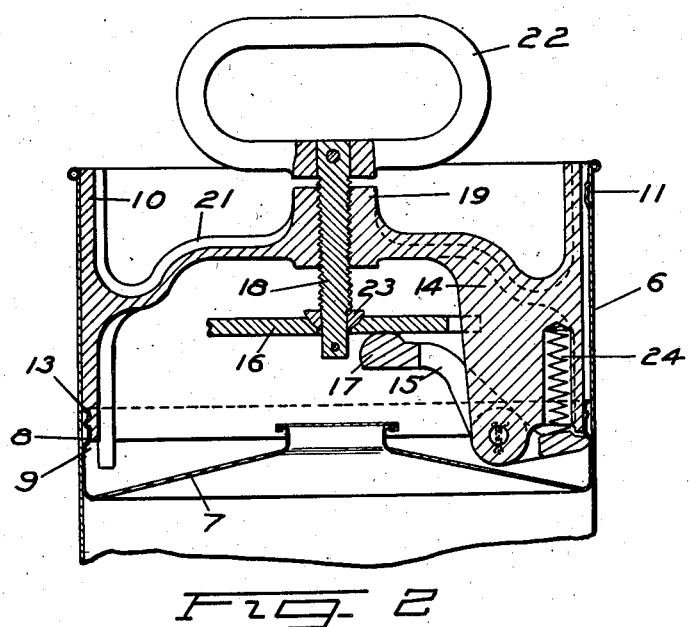
Figure 2 is a partial central section of the cartridge and piston guide of Figure 1 on the line II—II of Figure 3.

The lubricant dispenser of Figure 1 comprises a base 1 mounted on wheels 2 by which it may readily be moved from place to place and which carries a support 3 for an interchangeable lubricant cartridge 4. The base 1 carries a pump driven by a motor indicated at 5 and connected to receive lubricant from the cartridge and to discharge the lubricant therefrom under high pressure through a suitable hose or the like, not shown. The cartridge as best seen in Figure 2 is formed with a thin cylindrical side wall 6 and has at one end an outlet opening adapted to communicate with a suitable inlet stud carried by the support 3. The opposite end of the cartridge is closed by a thin walled piston 7 which is slidably mounted in the cartridge and which is provided in its peripheral portion with a groove 8 to receive a suitable packing and which also forms an internal annular shoulder indicated at 9. The cartridge is formed with a series of depressions 11 adjacent its open end forming inwardly extending lugs to prevent removal of the piston 7 through the open end of the cartridge.

It will be noted that the piston is relatively short axially, which is desirable in order to reduce the cost thereof and to reduce the amount of waste space in the cartridge. A piston of this type, however, is extremely liable to tilt or cock as it moves through the cartridge, thereby interfering with proper movement of the piston and possibly damaging the cartridge side wall.

In order to prevent such cocking of the piston there is provided according to the present invention a piston guide including a cylindrical body portion 10 of substantially the same external diameter as the internal diameter of the cartridge and having in its periphery a plurality of notches 12 to receive the lugs 11 whereby the body 10 may be inserted into the open end of the cartridge. The body 10 is formed adjacent its lower portion with an annular shoulder 13 adapted to seat on the upper edge of the piston 7. The body is further formed with a plurality of thin inwardly extending webs or ribs 14 on which are pivotally mounted locking fingers 15 having bifurcated central portions to receive the ribs 14. The outer ends of the fingers 15 are formed to engage beneath the annular shoulder 9 as shown in Figure 2 thereby to lock the body 12 rigidly to the piston 7.

The locking fingers 15 are controlled by means of a plate 16 having split ends to engage the ribs 14 thereby to prevent the plate from rotating. The plate rests on the inner ends 17 of the locking fingers 15 and is adapted to be moved axially of the cylindrical body 12 by means of a screw 18 screw threaded through a collar 19 which is rigidly secured to the cylindrical member 10 by means of a spider 21. The screw 18 has a suitable operating handle 22 and is provided with a semispherical abutment 23 to engage the plate 16. If desired, coil springs 24 may be provided to urge the fingers 15 toward their released position.

To secure the piston guide to a piston, it is first inserted through the open end of a cartridge with the grooves 12 in register with the lugs 11 of the cartridge. The body 10 is forced into the cartridge until the annular shoulder 13 seats on the upper edge of the cartridge piston 7 and the screw 18 is then turned through the handle 22 to force the plate 16 downwardly into contact with the locking finger ends 17. As the screw is rotated the locking fingers will be rocked about their pivots moving the outer ends thereof into engagement with the annular shoulder 9 of the piston and drawing the piston tightly against the shoulder 13. With the parts thus connected the piston may move through the cartridge and will be prevented from cocking or tilting due to the greater axial length of the cylindrical body 10 which engages with the cartridge side wall.

When used in a lubricant dispenser of the type illustrated in Figure 1 wherein the cartridge axis is vertical, the weight of the piston guide tends to urge the piston downwardly in the cartridge in a direction to force the contents thereof into the pump. This force together with atmospheric pressure acting on top of the piston will urge it downwardly when the pump is operated to force the contents of the cartridge into the pump.

Figure 3:
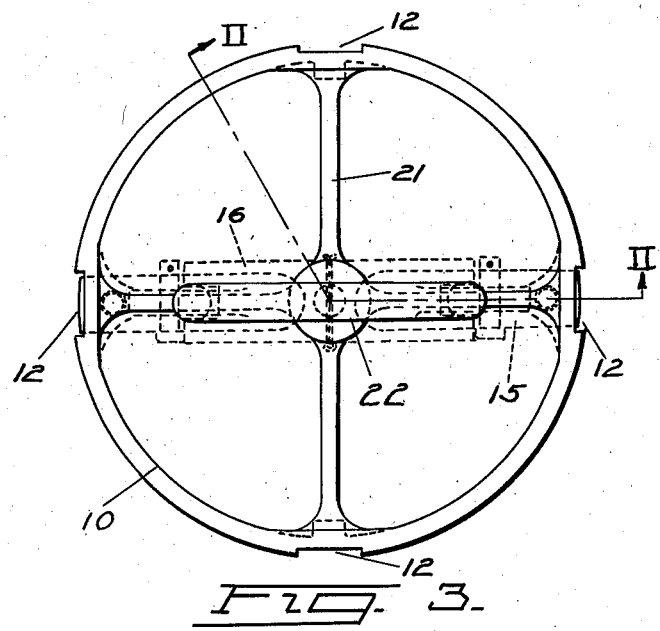
Figure 3 is a top plan view of the piston guide of Figures 1 and 2.
Figure 4:
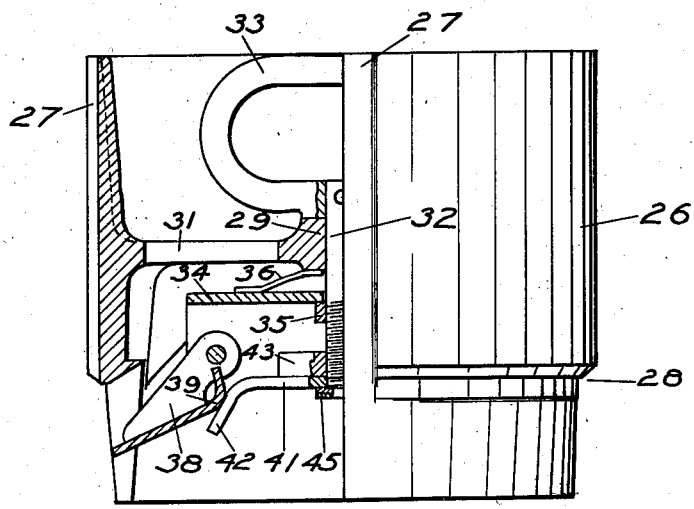
Figure 4 is a side view with parts in central section of a modified form of piston guide.
Figure 5:
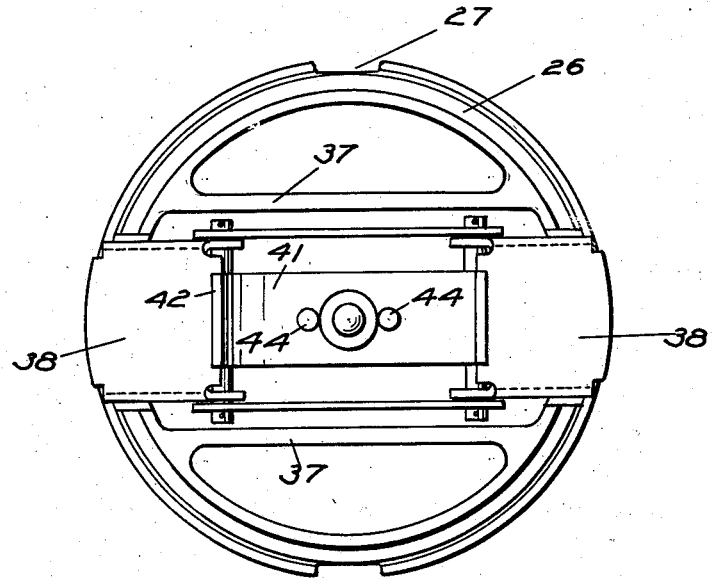
Figure 5 is a bottom plan view of Figure 4.

Figures 4 and 5 illustrate a modified form of piston guide including a cylindrical body portion 26 formed with peripheral grooves 27 similar to the grooves 12 in Figures 2 and 3 and with an annular shoulder 28 similar to the shoulder 13 of Figures 2 and 3. The cylindrical body 26 carries an axial collar 29 through a spider 31 and a rod 32 is rotatably mounted in the spider and is provided with a suitable handle 33. A channel shaped plate member 34 is freely mounted on the rod 32 below the spider and is held on the rod by means of a stop nut or the like 35, a leaf spring 36 being provided to urge the plate member 34 against the stop nut. The plate member 34 is prevented from rotating relative to the body 26 by means of parallel flanges 37 between which the plate member is mounted.

Locking fingers 38 are pivoted adjacent the ends of the plate member 34 between the sides thereof and are formed at their outer portions to engage beneath the annular shoulder 9 of a piston. At their inner ends the fingers are rounded off as at 39 for engagement with a suitable operating pawl 41.

The operating pawl 41 is in the form of a flat plate having down turned ends 42 to provide cam surfaces engageable with the curved portions 39 of the locking fingers. A nut 43 screw-threaded to the lower end of the rod 32 is rigidly secured to the cam plate 41 as by means of rivets or the like 44 (Figure 5) and the lower end of the rod 32 preferably carries a washer 45 to prevent removal of the plate 41 therefrom.

In operation, the piston guide of Figures 4 and 5 is inserted in a cartridge in the same manner as the piston guide of Figures 2 and 3. When the annular shoulder 28 is seated on the upper edge of the piston, the handle 33 may be turned, thereby causing the nut 43 and cam plate 41 to be moved axially of the body portion 26 toward the plate member 34. This movement swings the locking fingers 38 about their pivots causing the ends thereof to engage below the annular shoulder 9 on the piston to secure the piston rigidly to the guide.

Figure 6:
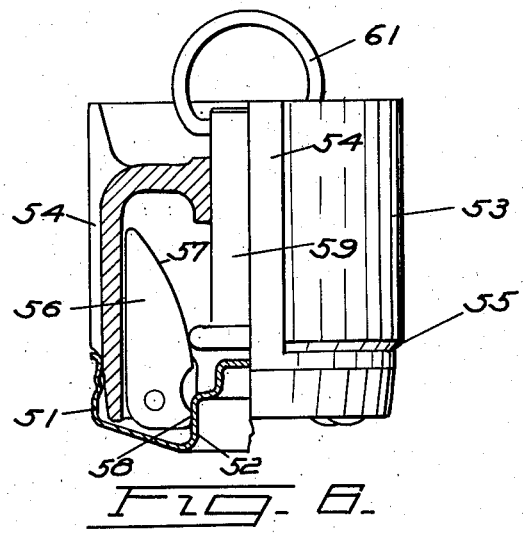
Figure 6 is a view similar to Figure 4 of a further modified form.

Figure 6 illustrates a further modified form of piston guide for use with a different type of piston, shown as including a cylindrical side wall 51 having at its center portion a cylindrical projection 52. The piston guide includes a cylindrical body portion 53 formed with longitudinal peripheral grooves 54 and having an annular shoulder 55 adapted to seat on the upper edge of the piston. A plurality of locking fingers 56 are pivoted adjacent their lower ends to the body portion 53 and are formed with cammed surfaces 57 through which they may be controlled. The lower ends of the cam fingers 56 are provided with gripping portions 58 adapted to engage the cylindrical projection 52 of the piston. The locking fingers are controlled by means of a plunger 59 which is slidably mounted in the body portion 53 and is provided with a suitable handle 61.

In using the piston guide of Figure 6, it is inserted in a cartridge and is forced thereinto until the annular shoulder 55 seats against the upper edge of the piston. The plunger 59 is then pressed downwardly during which movement it engages the cam surfaces 57 of the locking fingers 56 and moves the locking fingers about their pivots in a direction to force the gripping portions 58 into engagement with the cylindrical projection 52 on the piston. At this time, the piston will be rigidly attached to the piston guide and will thereby be prevented from cocking during its movement through the cartridge. In order to release the piston an operator need only to grasp the handle 61 and pull the plunger 59 outwardly, thereby releasing the locking fingers 56 and permitting the gripping portions 58 thereof to move away from the cylindrical projection 52.

While several embodiments of the invention have been shown and described, it will be apparent that many changes might be made therein and it is not intended to be limited to the precise forms shown nor otherwise than by the terms of the appended claims.

I claim:

1. In combination with a cartridge having a fixed end and a piston forming a slidable closure for its other end, a piston guide comprising, a body member adapted to be slidably received in the cartridge, clamp means for detachably securing said member to the piston, and manual means carried by said member for operating said clamp means.

2. In combination with a cartridge having a fixed end and a piston forming a slidable closure for its other end, a piston guide comprising, a body member adapted to be slidably received in the cartridge, a clamp finger pivotally carried by said member for securing the member to the piston, and a manual operating member movable axially of said body member and engageable with said clamp finger for operating the clamp finger.

3. In combination with a cartridge having a fixed end and a piston forming a slidable closure for its other end, a piston guide comprising, a body member adapted to be slidably received in the cartridge, a plurality of clamp fingers pivotally carried by said member and engageable with the piston to secure the piston to the member, a plate movable axially of the member and engageable with the fingers for moving them about their pivots, and manual means for moving said plate.

4. In combination, a lubricant cartridge having a cylindrical side wall, a fixed end and a piston forming a closure for its other end, said side wall being bent inwardly at a plurality of points about its circumference to form lugs for holding the piston in said cartridge, and a piston guide comprising a cylindrical body member formed with a plurality of axial grooves about its periphery adapted to register with said lugs whereby said member may be slidably received in the cartridge, and clamping means carried by the member for detachably securing it to the piston.

5. In combination, a lubricant cartridge having a cylindrical side wall, a fixed end and a piston forming a closure for its other end, said side wall being bent inwardly at a plurality of points about its circumference to form lugs for holding the piston in said cartridge, a piston guide comprising a cylindrical body member formed with a plurality of axial grooves about its periphery adapted to register with said lugs whereby said member may be slidably received in the cartridge, a plurality of clamp fingers carried by said member, and manual means for moving said fingers into engagement with the piston, thereby to secure the member to the piston.

6. A cartridge piston guide comprising, a body member adapted to be slidably received in a cartridge, clamping means movably carried by said member for detachably securing the member to a piston in the cartridge and means carried by said member to move said clamping means to clamping or releasing position.

7. A cartridge piston guide comprising, a body member adapted to be slidably received in a cartridge, a clamp finger pivotally carried by said member, and a manual operating member movable axially of said body member to operate said clamp finger thereby to secure the body member to a piston in the cartridge.

8. A cartridge piston guide comprising, a body member adapted to be slidably received in a cartridge, a plurality of clamp fingers pivotally carried by said member, a plate movable axially of said member for operating said clamp fingers, and an operating screw threadedly connected to said member for moving the plate.

9. A cartridge piston guide comprising, a body member adapted to be slidably received in a cartridge, a plurality of clamp fingers pivotally carried by said member and formed with cam surfaces, and an operating member engageable with said cam surfaces for operating said clamp fingers.

HARRY R. TEAR.